_2,789,047_

THERMAL PRODUCTION OF SODIUM

Charles H. Lemke, Niagara Falls, N. Y., assignor to E. I. du Pont de Nemours and Company, Wilmington, Del., a corporation of Delaware No Drawing. Application September 15, 1954, Serial No. 456,327

8 Claims. (Cl. 75—66)

This invention relates to the production of alkali metals by reaction of their respective hydroxides with carbon at relatively high temperatures. More particularly, it relates to an improvement in the method of preparing metallic sodium by reacting molten caustic and coke.

The reaction between caustic and carbon to produce sodium has been known for many years. Thus Castner, U. S. P. 342,897, disclosed a process utilizing such a reaction, suggesting, however, that a carbide is preferable to carbon alone as a reactant. A general equation for this procedure may be written as:

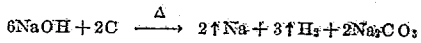

Several improvements in Castner's process have been reported, notably by Thowless in U. S. P. 380,775 and by Ylla-Conte in U. S. P. 1,837,935, but electrolytic reduction of sodium salts has gradually superseded it along with other thermal processes such as that of DeVille.

The thermal processes have generally the obvious advantage over the electrolytic process that they require no electric current. This advantage becomes of increasing importance as the price of electric power goes up. The thermal processes also have the advantage that they can produce sodium containing less impurities than that prepared electrolytically. Electrolytic methods for making sodium operate on mixtures of fused salts and other metals present in the mixture deposit out with the sodium. Sodium produced by the DeVille reaction between sodium carbonate and coke is sometimes contaminated with carbon and the carbonate reversibly formed as the sodium is condensed but is free from metallic impurities. Sodium made by Castner's thermal process is free from carbon and carbonate as well as other metals.

A major factor hindering the development of Castner's thermal process has been the low yield obtained therefrom. Reference to the equation shown above indicates that a maximum yield from the sodium hydroxide is only 33⅓%. In practice, however, the maximum generally obtainable is less than this amount, around 10–18% or about half the theoretical unless relatively higher temperatures are used. Higher temperature may result in the DeVille reaction producing carbon monoxide, difficult to separate from sodium vapors. An object of this invention is consequently provision of a method for improving the yield of sodium obtained from the reaction between molten sodium hydroxide and carbon at a given temperature. Another object is provision of a method of producing sodium from caustic and carbon without the risk of evolving carbon monoxide.

The above-mentioned and other objects are achieved in accordance with this invention by a process in which the sodium is swept out from the reaction chamber as soon as it is formed by means of an inert gas. Suitable inert gases include hydrogen, helium, argon and other noble gases of the zero group of the periodic table. Carbon monoxide and dioxide are not desirable because they react with sodium as the latter is cooled and can be separated only with great difficulty therefrom. Nitrogen cannot be used since it may form a cyanide under the given reaction conditions. Of the gases mentioned as suitable, hydrogen is much preferred because it increases the yield to a greater extent than the other gases do and is readily available as a product of the reaction. Thus a yield as high as 91% of the theoretical can be obtained fairly easily with hydrogen. A yield of only about 85% can be obtained using helium under the same conditions of temperature and pressure.

Apparatus requisite for carrying out the instant process may be very simple and conventional. An iron or steel pipe closed at the bottom and provided with a side arm serves as an adequate retort. The lower part of the pipe is placed in a furnace for heating. The charge of caustic and carbon is inserted into the retort and the latter closed by means of a top pierced with a pipe of smaller diameter than the retort. This pipe may penetrate into the charge and act as a conduit for hydrogen or other inert gas. When the retort is heated and hydrogen passed therethrough evolved sodium is swept out the side arm and may be condensed as desired.

The temperature of the reaction may vary within fairly wide limits. The reaction begins very slowly at around 700° C. and increases in velocity as the temperature is raised. At around 1000° C.–1100° C. the DeVille reaction may start, producing contaminating carbon oxides. Preferably then the temperature should be maintained in the approximate range 700° C.–1000° C. A convenient range is 800° C.–950° C., i. e., around the natural boiling point of sodium.

Gas pressure under the temperature conditions described should be ambient or atmospheric. Elevated pressures can be used but to no specific purpose. Reduced pressures may also be used but complicate the equipment design and require costly vacuum facilities. It will be understood that the sweeping gas will itself be supplied under some elevated pressure. The ambient pressure mentioned, therefore, refers to the pressure at the outlet which, as described, may be a condenser attached to the side arm.

The quantity of hydrogen utilized as a sweeping gas is of some importance. At any given temperature within the operable range, the sodium yield increases as the ratio of sweeping gas fed to hydrogen produced is increased, but the rate of sodium yield increase diminishes as the ratio is increased. Thus the economic optimum amount of sweeping gas to be used is about 4 to 6 times the amount of hydrogen formed by the reaction, since the yield improvement is small for larger amounts.

The rate at which the sweeping gas is fed is of minor importance if adequate contacting means, disengaging space, and condenser capacity are provided. Due to a pronounced tendency for the reactants to foam during the early stages of reaction, it has been found advantageous to start the sweeping gas flow some time after the beginning of reaction, usually when the spontaneous evolution of hydrogen has substantially subsided. Hydrogen may, of course, be recycled through the system after the sodium has been chilled therefrom.

Other variables important to this invention are essentially those of the Castner thermal process itself. Thus carbon may be employed in any of its well-known commercial forms. Coal, coke, carbon black, wood charcoal and the like may be used indifferently. Preferably, the carbon is comminuted to facilitate reaction with caustic. Particle size of the carbon may vary, material sized to pass through 10 mesh screens but retained on 300 mesh having been utilized in various runs. Relatively coarse material is preferred to avoid runaway reactions and excessive foaming of the type discussed above. Material passing through 10 mesh screens but retained on 30 mesh (i. e. of 10–30 mesh) is consequently preferred.

Other alkalis may be substituted for caustic in this process, yielding the corresponding alkali metal. Potassium hydroxide may obviously be used instead of sodium hydroxide. The hydroxides of any of the alkali metals except lithium may in fact be substituted for caustic. Lithium boils at too high a temperature to be readily prepared by the present Castner process.

The theoretical explanation for the great increase in yield obtained with a sweep gas is not known. One possible explanation is that reaction between alkali hydroxide and carbon is reversible and is favored by rapid removal of one of the products of the reaction. The increase in yield obtained when hydrogen is used is not entirely susceptible to this reasoning, however, since hydrogen itself is one of the products and should favor the reverse reaction. Side-reactions of some type are therefore probably involved. It will be appreciated that the inventor is not to be bound by this discussion which is clearly offered as theory alone.

The invention will be understood in more detail from the illustrative examples which follow. In all runs the pressure at the outlet end of the retort employed was ambient. The percentage yields, based on the equation cited, relate to the amount of sodium obtainable without evolution of carbon monoxide and not to the amount present in the caustic employed.

EXAMPLE 1

This example shows yields obtained from runs utilizing no sweep gas and is included solely as a control.

Three runs were made with the retort in an inclined position. The retort was charged with approximately stoichiometric quantities of pelleted commercial sodium hydroxide and petroleum coke. Heat was supplied to the retort to melt the caustic and reaction initiated at around 680° C.–700° C. The sodium was collected in a condenser and glass wool filter connected to the side arm and weighed. No gaseous reaction product other than sodium and hydrogen was evolved. Heat was applied until evolution of gases ceased.

Yields in percentages of the theoretical were as follows: (1) at 750° C., 15%; (2) at 850° C., 55%; and (3) at 920° C., 85%.

EXAMPLE 2

This example shows the yield obtained using hydrogen to sweep evolved sodium vapor through the condenser.

A series of runs was made in essentially the manner described in Example 1 except that hydrogen was metered through the reactants. Results are shown in the table.

Table.—Use of hydrogen as a sweep gas

| Maximum Temperature | 750° C. | | 850° C. | | |
|---|---|---|---|---|---|
| Run | 1 | 2 | 3 | 4 | 5 |
| Liters of Sweeping Gas (H$_2$) Used | 37.5 | 275.6 | 30 | 104.2 | 174.8 |
| Percent Sodium Yield | 41.2 | 73 | 82.8 | 85.6 | 91 |

EXAMPLE 3

This example shows the effect obtained on substituting helium for hydrogen.

Run 5, above, was substantially repeated except that the hydrogen was replaced by helium. Under these circumstances the yield was only 85%.

Having described my invention, I claim:

1. The method of producing an alkali metal other than lithium which comprises reacting the molten hydroxide of said metal with carbon at a temperature no greater than about 1000° C. while passing therethrough a stream of an inert gas chosen from the group consisting of hydrogen and the noble gases and subsequently recovering said alkali metal from the inert gas.

2. The method of producing sodium which comprises reacting molten sodium hydroxide with carbon at a temperature no greater than about 1000° C. while passing therethrough a stream of hydrogen gas and subsequently collecting sodium from the hydrogen gas.

3. The method of claim 2 in which the reaction is carried out at about 700° C.–1000° C.

4. The method of claim 3 in which the reaction is carried out at about 800° C.–950° C.

5. The method of claim 3 in which the carbon is in the form of particulate petroleum coke.

6. The method of obtaining metallic sodium which comprises reacting sodium hydroxide with an approximately stoichiometric quantity of particulate carbon at a temperature of 800° C.–950° C. while passing therethrough a stream of hydrogen gas at atmospheric pressure and subsequently recovering sodium from said hydrogen.

7. The method of claim 6 in which the total quantity of hydrogen passed through the reactants is about 4–6 times that produced by the reaction.

8. The method of claim 7 in which the sodium is recovered from the hydrogen by condensation.

References Cited in the file of this patent
UNITED STATES PATENTS

| 2,456,918 | Church | Dec. 21, 1948 |
| 2,456,935 | Fisher | Dec. 21, 1948 |